Jan. 5, 1926.

G. A. R. TRIMMING

TRANSITION COUPLING DEVICE

Filed March 19, 1925    2 Sheets-Sheet 1

1,568,933

Inventor:
George Augustus Roderick Trimming

Jan. 5, 1926. 1,568,933
G. A. R. TRIMMING
TRANSITION COUPLING DEVICE
Filed March 19, 1925  2 Sheets-Sheet 2

Inventor:
George Augustus Roderick Trimming

Patented Jan. 5, 1926.

1,568,933

UNITED STATES PATENT OFFICE.

GEORGE AUGUSTUS RODERICK TRIMMING, OF LUCKNOW, BRITISH INDIA.

TRANSITION COUPLING DEVICE.

Application filed March 19, 1925. Serial No. 16,758.

*To all whom it may concern:*

Be it known that I, GEORGE AUGUSTUS RODERICK TRIMMING, a subject of His Majesty King George V, and resident of Lucknow, Oudh & Rohilkhand Railway, British India, have invented certain new and useful Improvements in Transition Coupling Devices (for which I have filed a British Indian application No. 10,151, March 7, 1924), of which the following is a specification.

My invention relates to transition couplings for railway or like vehicles and the object of my invention is to produce a coupling which will permit of new or "converted" stock fitted with automatic couplers being coupled up with "unconverted" stock during the transition period.

A further object of my invention is to produce a coupling that will be light and easy to handle, easy and cheap to manufacture, impossible to get out of order and capable of being uncoupled from outside the vehicles.

In the accompanying drawings in which like numbers of reference indicate like parts throughout:—

Figure 8:
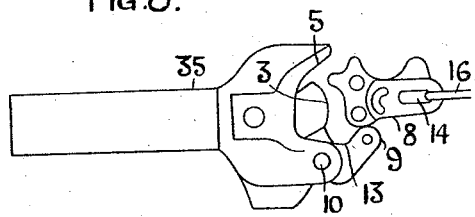
Figure 8 is a plan showing an automatic coupler and a transition locker as they are being brought into contact.
Figure 10:
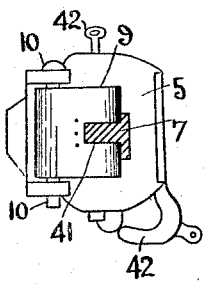
Figure 10 shows an end view of an automatic coupler.
Figure 9:
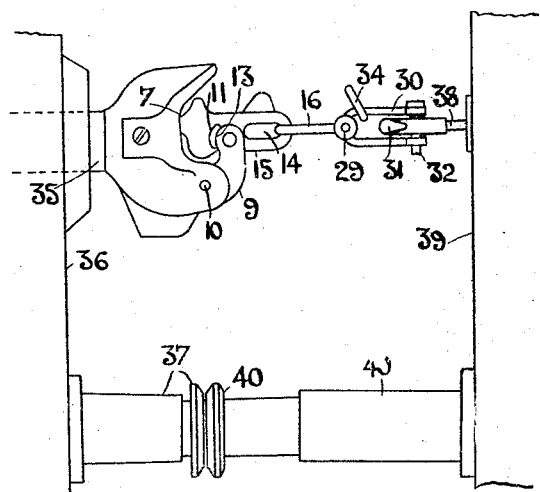
Figure 9 is a plan of part of a vehicle fitted with an automatic coupler and part of an "unconverted" vehicle coupled together.

According to this invention, the transition locker 1, is so arranged that when held in a horizontal position to couple up with an automatic coupler it will function in a similar manner as an automatic coupler would—namely its closing face 2 will meet the knuckle hub 3 of the automatic coupler and bring the knuckle 9 thereof to the locked position (see Figs. 8, 9 and 10). The transition locker is maintained in locked position by a slot 41 (see Fig. 10) cut in the face of the knuckle 9 of the automatic coupler in which slot the locker 1 rests.

In the coupling operation, as the locker 1 approaches the automatic coupler, the edge 2ª (see Fig. 1) of its closing face 2 may pass through the slot 41 (see Fig. 10) of the coupler and the face 2 then contacts with the knuckle hub 3 (see Fig. 8) pressing it home and causing the knuckle of the automatic coupler to rotate as a whole, in the usual manner, around the knuckle pivot 10. The guiding face 4 (see Fig. 1) of locker 1 then strikes the guard arm 5 (see Fig. 8) which forces the locker towards its final position—i. e. causes it to move to the left as viewed from above facing the direction in which the locker is moving (see Fig. 8). This guiding action causes the locker to take up a central position relatively to the automatic coupler and causes the horn 6 of the locker to enter the depression 7 in the coupler face, in which depression the horn 6 lies alongside or close to the knuckle shank.

At the same time, this guiding movement causes the supporting part 8 of the locker to enter deeply into the slot 41 cut in the knuckle 9, and also causes the projection 11 to be moved round the end of the knuckle 9 and to take up a position in contact with the pulling face 13 of the knuckle (see Fig. 9). It will thus be seen that the closing face 2 brings the knuckle to its locked position in which it becomes automatically locked by the falling of the coupler lock; the face 4 guides the transition locker centrally in conjunction with 2; and the horn 6 maintains the transition locker in its central position and in combination with the projection 11 (or 28) prevents the locker from being pulled out of position, until the lock lifter of the automatic coupler is operated to release the coupling.

The locker being forced into the slot 41 in the coupler is an important feature of the invention, as it is the support given by this slot to the supporting part 8 or 8ª which prevents the locker from getting disengaged by sliding vertically downwards on the couplings slackening during a buffing shock.

Figure 6:
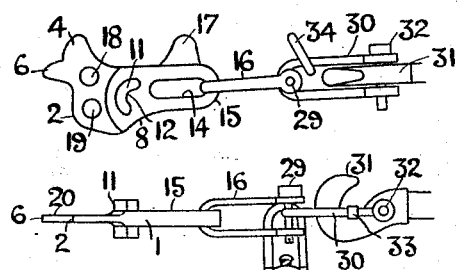
Figures 6 and 7 are drawn, to a smaller scale, showing a plan and a side view respectively of the transition device and an ordinary screw-coupling.
Figure 7:
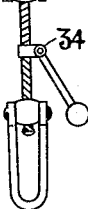

The locker has a rear extension having a slot 14 for connecting the locker to its link or shackle 16 (see Figs. 6 and 7). A reasonable amount of longitudinal play between the link 16 and the locker 1 is advisable to allow of movements under severe buffing shocks.

Figure 1:
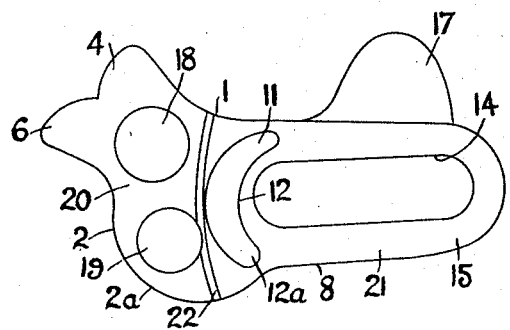
Figures 1 and 2 are a plan and side view respectively of the preferred form of the transition locker.

The projections 11 may be of any convenient shape. As illustrated in Figure 1, they have rounded contours to admit of their ends 12ª easily to pass round the knuckle 9, and a concave face 12 adapted to fit and/or to engage and hold onto the rear part of the knuckle or the pulling face 13 of the automatic coupler when the latter is in engaged and locked position (see Fig. 9).

Figure 5:
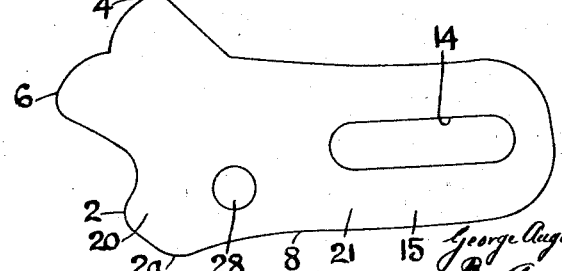
Figure 5 is a plan of a locker similar to the preferred embodiment, but illustrating some modifications.

The projection 11 may be replaced by a pin as shown at 28 in Figure 5. The projection may be on one side only of the locker, but preferably, to provide a central pull, will be provided on both the upper and lower surfaces.

For ease in handling, a projection 17 may be provided on the locker and to lighten the parts perforations or depressions 18, 19 may be formed in the part 20.

Figure 2:
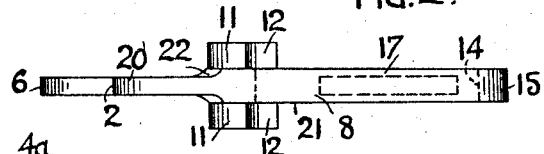

In the preferred embodiment of the locker shown in Figures 1 and 2 the forward portion 20 is of smaller cross-section than the supporting part 8 or 21. The object of this is so that the edge 2ª may easily enter the slot 41 in the knuckle 9 and act as a pilot to guide the supporting parts 8 and 21 into proper position, and a bevelled portion 22 may lead from the one part to the other to facilitate these operations.

Figure 3:
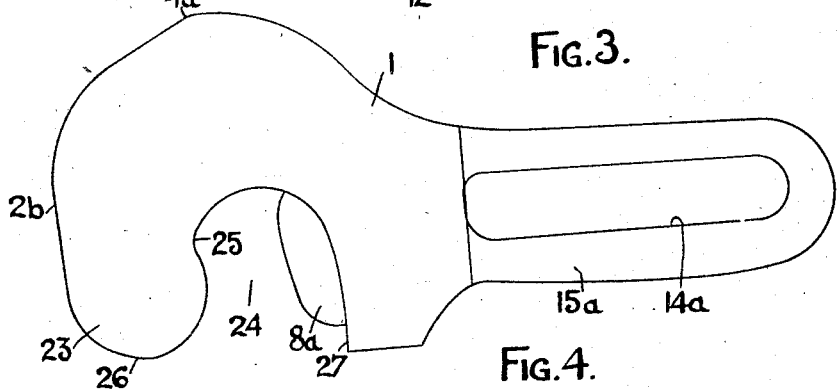
Figures 3 and 4 are similar views of a modification.
Figure 4:
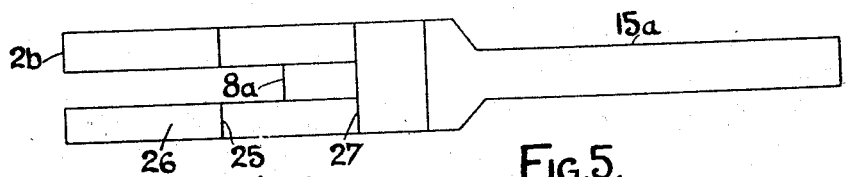

In the modification shown in Figures 3 and 4, the locker is modelled on the shape of the knuckle of an automatic coupler. In this case the part 23 is similar in shape to the knuckle 9 of the automatic coupler, and the part 27 corresponds to the front surface of the knuckle hub 3. A gap 24 is provided to admit the corresponding part of the automatic coupler. This locker functions in the same manner as the one first described. The part 23 passes round the knuckle 9 of the automatic coupler, the surface 2ᵇ strikes the knuckle hub 3, the surface 4ª at the same time engages the guard arm 5 and the transition locker is forced into place, the end 26 of its nose taking up the desired position behind the knuckle 9, while the surface 25 engages the pulling surface 13 of the automatic coupler's knuckle when the latter is forced into its closed and locked position. At the same time, the projection 8ª enters the slot 41 in the automatic coupler's knuckle nose to prevent vertical displacement. A stem 15ª having a slot 14ª is provided for the attachment of the link or shackle.

In the modification illustrated in Figures 1, 2, and 5, the parts 6, 11 or 28 and 8 may be so arranged that clearances are allowed enabling the locker to have sufficient play when locked in position to enable it to accommodate itself to eccentric pulls received whilst the vehicle is passing around curves or negotiating points and crossings.

Figures 6 and 7 illustrate the arrangement of the couplings on an "unconverted" wagon fitted with this transition locker, in addition to the ordinary screw coupling. In these figures, the link or shackle 16 of the transition locker is connected in any desired manner (for example by a shackle pin 29) to the draw-bar shackle 30 which in turn is fixed to the draw-bar hook 31 by means of the shackle pin 32.

The ordinary screw coupling 34 may also be hung upon this draw-bar shackle 30.

If the screw coupling 34 and the transition locker 1—16 both hang from the draw-bar shackle 30 vertically downwards from the pin 32 it will obviously be necessary to lift not only the part needed for the coupling to be effected but the other part also, and to swing the draw-bar shackle 30 with both these parts attached to a horizontal position, before either part can be coupled to the adjoining vehicle. To avoid this the draw-bar shackle 30 may be supported in a raised position, preferably in a substantially horizontal position as shown in the side view (Fig. 7). This may be effected by fitting a clip 33 to hold the shackle 30 substantially horizontal. The combination of a draw-bar shackle supported in a raised position with the transition locker and the screw coupling is a feature of this invention, because unless the draw-bar shackle is held in such raised position to relieve the operator of the weight it is difficult if not impossible for a single person to effect the coupling, when both the transition locker and the screw coupling are attached to the draw-bar shackle.

If for any reason both the transition locker and screw coupling are not attached to the draw-bar shackle, the transition locker alone may be attached thereto in which case it will not be essential to maintain the draw-bar shackle in a raised position.

Figures 8 and 9 illustrate one manner in which the coupling operation between an "unconverted" vehicle and one fitted with an automatic coupler is effected. In these the automatic coupler shank 35 is fitted to its vehicle 36 in the usual manner. The draw-hook 31 is connected by the draw-bar 38 to its vehicle 39. The first vehicle has dummy buffers 37, whilst the "unconverted" vehicle 39 has ordinary buffers 40. For coupling the two vehicles are brought together and the coupling is actually effected as the buffers meet or whilst the springs of the buffers 40 are compressed due to the shock.

In the uncoupling of vehicles thus coupled the lock lifter 42 (Fig. 10) may be manipulated by means of known gear (not shown) from the outside.

It will of course be understood that the invention includes within its scope reasonable modifications of the constructions shown.

I claim:—

1. A transition locking device and apparatus for use in combination with an automatic car coupler provided with the well-known movable knuckle having a hub, said transition locking device comprising a closing face adapted to engage said hub, a guide-face for guiding the locking portion of the locking device into locking position relative to said knuckle, a projection intermediate said faces adapted to enter a depression in the body portion of said automatic coupler and means operable from the outside of the automatic coupler to release said knuckle from its locked position and thereby effect uncoupling of the coupling members.

2. For use with an automatic car coupler provided with the well-known movable knuckle having a hub, a transition locking device comprising a closing face adapted to engage said hub, a guide-face for guiding the locking portion of the locking device into locking position relative to said knuckle, a horn adapted to enter a depression in the body of said coupler, a supporting part adapted to engage a slot in said knuckle and projections so arranged as to engage the forward end of said knuckle to receive the pull exerted thereon.

3. A transition locking device adapted for use in combination with an automatic car coupler provided with the well-known movable knuckle having a hub, said transition locking device comprising a closing face adapted to engage said hub, a guide face for guiding the locking portion of the locking device into locking position relative to said knuckle, a projection intermediate said two faces adapted to enter a central depression in the body portion of said automatic coupler, a supporting part adapted to engage a slot in said knuckle, projections so arranged to engage the forward end of said knuckle so as to receive the pull exerted thereon, and a slotted stem to receive the link of a draw gear coupling.

4. A transition locking device adapted for use in combination with an automatic car coupler provided with the well-known movable knuckle having a hub, said transition locking device comprising a closing face adapted to engage said hub, a guide-face for guiding the locking portion of the locking device into locking position relative to said knuckle, a projection intermediate said faces adapted to enter a depression in the body portion of said automatic coupler, a supporting part adapted to engage a slot in said knuckle, means arranged to engage the forward end of said knuckle so as to receive the pull exerted thereon, and a lateral projection constituting a handle for said locking device.

5. A transition locking device adapted for use in combination with an automatic car coupler, provided with the well-known movable knuckle having a hub, said transition locking device comprising a closing face adapted to engage said hub, a guide-face shaped to guide the locking portion of the locking device into locking position relative to said knuckle, a horn intermediate said faces adapted to enter a central depression in the body portion of said coupler, a supporting part of greater cross-section than the locking portion of the locking device adapted to enter a slot in said knuckle, projections in a position on the locking device to engage the curved forward end of said knuckle so as to receive the pull exerted thereon, and a slotted stem to receive the link of a draw gear coupling.

6. The transition locking device as specified in claim 5, in which said horn is narrower than said depression so as to afford sufficient clearance for the relative movement between the locking device and the automatic coupler.

In testimony whereof I hereto affix my signature this 16th day of February, 1925.

GEORGE AUGUSTUS RODERICK TRIMMING.